FIG. 1.

INVENTORS
WILLIAM EICHENBAUM
MANLEY MANDEL
By Morton Amster
ATTORNEY

Oct. 13, 1959 W. EICHENBAUM ET AL 2,908,220
DUPLICATING APPARATUS
Filed Dec. 8, 1954 7 Sheets-Sheet 4

INVENTORS
WILLIAM EICHENBAUM
MANLEY MANDEL

By Morton Amster
ATTORNEY

FIG. 9.

INVENTORS
WILLIAM EICHENBAUM
MANLEY MANDEL
BY
Morton Amster
ATTORNEY

United States Patent Office 2,908,220
Patented Oct. 13, 1959

2,908,220

DUPLICATING APPARATUS

William Eichenbaum, Jersey City, N.J., and
Manley Mandel, Amherst, Mass.

Application December 8, 1954, Serial No. 473,778

19 Claims. (Cl. 101—132.5)

The present invention relates to duplicating apparatus, and particularly to an automatic addressograph machine for successively bringing masters and blanks into transfer relation relative to each other. This is a continuation-in-part of our earlier application, Serial No. 391,199 entitled "Duplicating Method and Apparatus," filed on November 10, 1953.

Numerous business establishments, especially those engaged in finance and installment selling operations, have a pressing need for a speedy and economical method of preparing and repeatedly handling mass mailings. Such mass mailings require the duplication of a name and address onto an envelope, a postcard or the like. Although conventional addressograph machines employing metal address plates are functionally suited to meet this need, it is often unfeasible to employ such machines due to the initial capital investment, the cost of the addressograph plates, and the expense involved in preparing in preparing such addressograph plates. Frequently the situation arises where the number of mailings required for a single address are too small to merit the cost of preparing an addressograph plate, yet the number of mailings is too large for individual typing without prohibitive cost. In part the cost problem may be met with masters which include a stencil paper window supported within a relatively thick and rigid frame. This type of master plate may be fed continuously and in abutting relation through known addressing equipment which reproduces the information on the stencil paper by impressing the same onto the mail piece. This type of master plate likewise is relatively expensive and involves the use of a fairly complicated and expensive equipment.

We have found that it is to advantage to employ a standard single writing system in which relatively flexible paper stock master cards are prepared with hectograph impressions of the information to be duplicated. Such hectograph impressions are formed on the master cards by known typing mechanisms. The master cards, employed to reproduce the hectograph material thereon for as many as two hundred times, are not of special construction and are relatively thin stock. Thus, the master cards take up little space and may be prepared, handled and replaced without any real concern as to cost.

Accordingly it is an object of the present invention to provide an improved duplicating system and machine obviating one or more of the difficulties of known apparatus. Specifically it is within the contemplation of the invention to provide duplicating equipment which employs easily prepared and relatively inexpensive masters for the duplicating operation.

It is a still further object of the present invention to provide new and improved duplicating apparatus which automatically brings paper stock masters having hectograph impressions thereon into impression-transfer relation to paper stock blanks, such as mailing envelopes. Although the invention finds special advantage in mass mailings which cannot be achieved with addressograph apparatus because of cost considerations, it is to be expressly understood that the applications of the present mechanisms are virtually coextensive with the known uses of duplicating equipment.

Conventional duplicating machines employ printing rollers or platens which are intermittently fed with successive masters and impression-receiving blanks. Such systems usually have a fixed timing relationship which is established, for example, by the masters. In those machines employing masters of the type having a stencil paper window supported within a relatively thickened rigid frame, the masters are fed in end-to-end and abutting relation such that a fixed timing is established assuring registry between masters and blanks for duplication within the machine. It has been generally thought in the duplicating field that without such positive internal control there would be no reasonable assurance of coincidence between masters and blanks and/or proper registry at the printing rollers or platens. Attempts to feed blanks and masters substantially at the same rate without some positive control is exceptionally difficult, especially when attempting to accomplish such feed with automatic feeding mechanisms which operate at relatively high speed such that reasonable outputs may be expected for the automatic duplicating operation. The problem becomes still more complicated due to the ever-present risk that the feeder will skip the delivery of a master or blank, or deliver more than one master or blank. Such improper or faulty operation is usually prohibitive in that it represents one or more mailing pieces which will not be automatically prepared from the master cards. Still further complications are introduced when attempting to establish a system in which master cards are fabricated of flexible and relatively thin paper stock, such as might be suitable to receive hectograph impressions.

It is a further object of the present invention to provide addressograph equipment designed specifically for relatively high-speed operation and which assures coincident delivery of masters and blanks to a duplicating location.

It is a still further object of the present invention to provide a duplicating machine for delivering masters and blanks to a duplicating location in which the risk of faulty operation is minimized.

It is a still further object of the present invention to provide addressograph equipment which is operative only upon tandem delivery of a master and blank to a duplicating station, thus virtually precluding the possibility of missing one of a large number of masters.

Certain objects of the present invention are realized by the provision of duplicating mechanisms including reproducing or duplicating rollers which are driven through a duplicating cycle only upon delivery of a master and a blank in proper registry to a pick-up location or point relative to the duplicating rollers. In accordance with a preferred embodiment of the invention the roller-type duplicating apparatus has separate feed paths arranged to deliver master and impression-receiving blanks to the pick-up location forwardly of the printing or reproducing rollers. Electrical sensing means, such as electrical eyes, are arranged along the separate feed paths which are responsive to the arrival of a master and a blank at the pick-up location in advance of the printing or duplicating rollers. The electrical sensing means together control appropriate mechanisms, which after sensing pairing of a master and a blank at the pick-up location, cause the paired master and blank to be advanced through an impression transfer or duplicating cycle.

As a further feature of the invention, the individual feeders for the respective delivery paths are controlled by delivery of the successive pairs of masters and blanks to the duplicating rollers such that reliable operation is assured. Although in this respect the feeders are intermittently operated, such intermittency may be so high that for all practical purposes the duplicating procedure is a continuous flow one and completely compatible with the requirements for high-speed continuous operation.

The above brief description, as well as other objects, features and advantages of the present invention will be best appreciated by reference to the following detailed description of a presently preferred illustrative embodiment, when taken in conjunction with the accompanying drawings, wherein:

Fig. 11 is a rear elevational view, with parts broken away, showing the details of the drive for the modified duplicating machine shown in Fig. 10; and, Fig. 12 is a schematic diagram showing a control and sensing circuit for the modified form of the invention illustrated in Fig. 10.

Referring now specifically to the drawings, there is shown an illustrative duplicating or addressograph machine according to the present invention which generally includes a frame 10, cooperating duplicating or printing rollers 12, 14 which are adapted to receive blanks B and masters M from a pick-up or printing location 16 adjacent the tangential peripheral contact of the rollers 12, 14, individual feed paths 18, 20 which converge toward the pick-up location 16 in advance of the printing rollers 12, 14, and respective delivery mechanisms 22, 24 for feeding the masters M and blanks B along the converging feed paths 18, 20. The master cards may be of any appropriate paper stock, such as thin gauge cardboard having impressed thereon by conventional hectograph typing apparatus impressions for transfer to appropriate blanks B such as envelopes, postal cards or other blank stock.

Trailing the printing or duplicating rollers 12, 14 is a stacker system 26 which is adapted to receive successive blanks B with the hectograph impression thereon. Disposed beneath the stacker 26 is a storage bin or receptacle 28 which receives successive masters after the duplicating operation.

Along the feed path 18 for the masters M is a check station 30 which is arranged to control the delivery of the masters toward the printing rollers 12, 14 and further to control operation of the delivery mechanisms 22.

Adjacent the printing rollers 12, 14 are sensing systems 32, 34 and 36 which are arranged to control the operation of the printing rollers 12, 14 in dependence upon coincident delivery of masters M and blanks B to the pick-up location 16 in advance of the duplicating rollers 12, 14.

Preliminary to a detailed discussion of the mechanism as broadly described, their interrelation will be set forth generally such that the detailed description which is to follow will be more easily understood.

In the starting position the blanks B, for example envelopes, are placed face down in the feeder 24 while the masters M are placed face up in the feeder 22. When the power is turned on the feeders operate and the feeder 24 advances a blank to the pick-up location 16. The feeder 22 advances the master to the check station 30 which is effective to allow a single master to advance to the pick-up location and to interrupt operation of the feeder 22. At the pick-up location, the properly registered master and blank, through the sensing elements 32, 34 and 36 are effective to cycle the printing rollers 12, 14 to complete the duplicating operation whereupon the envelope with the hectograph impression on the underface thereof is advanced onto the stacker 26 while the masters are fed into the receptacle 28.

Figure 1:
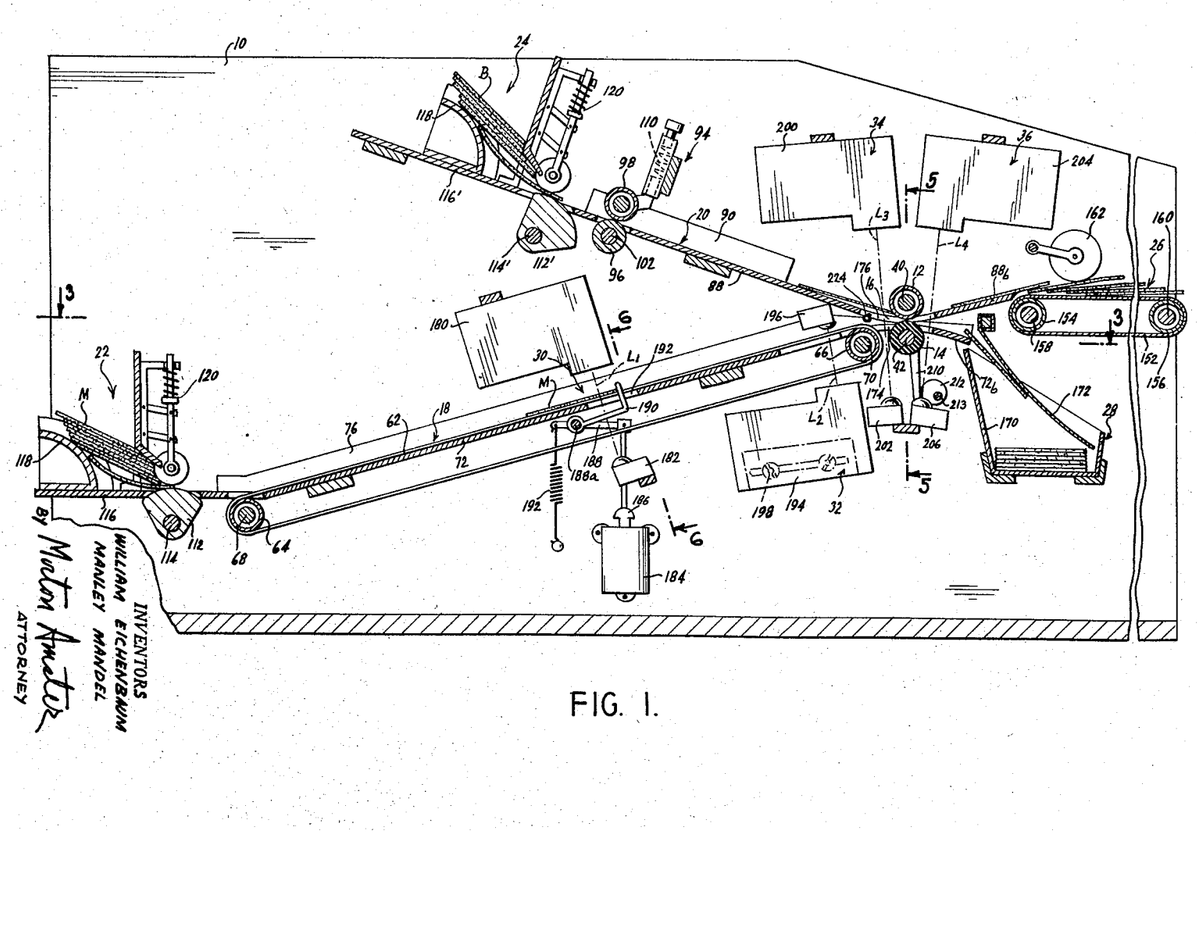
Fig. 1 is a longitudinal sectional view showing a duplicating machine or addressograph embodying features of the present invention.
Figures 2, 7:
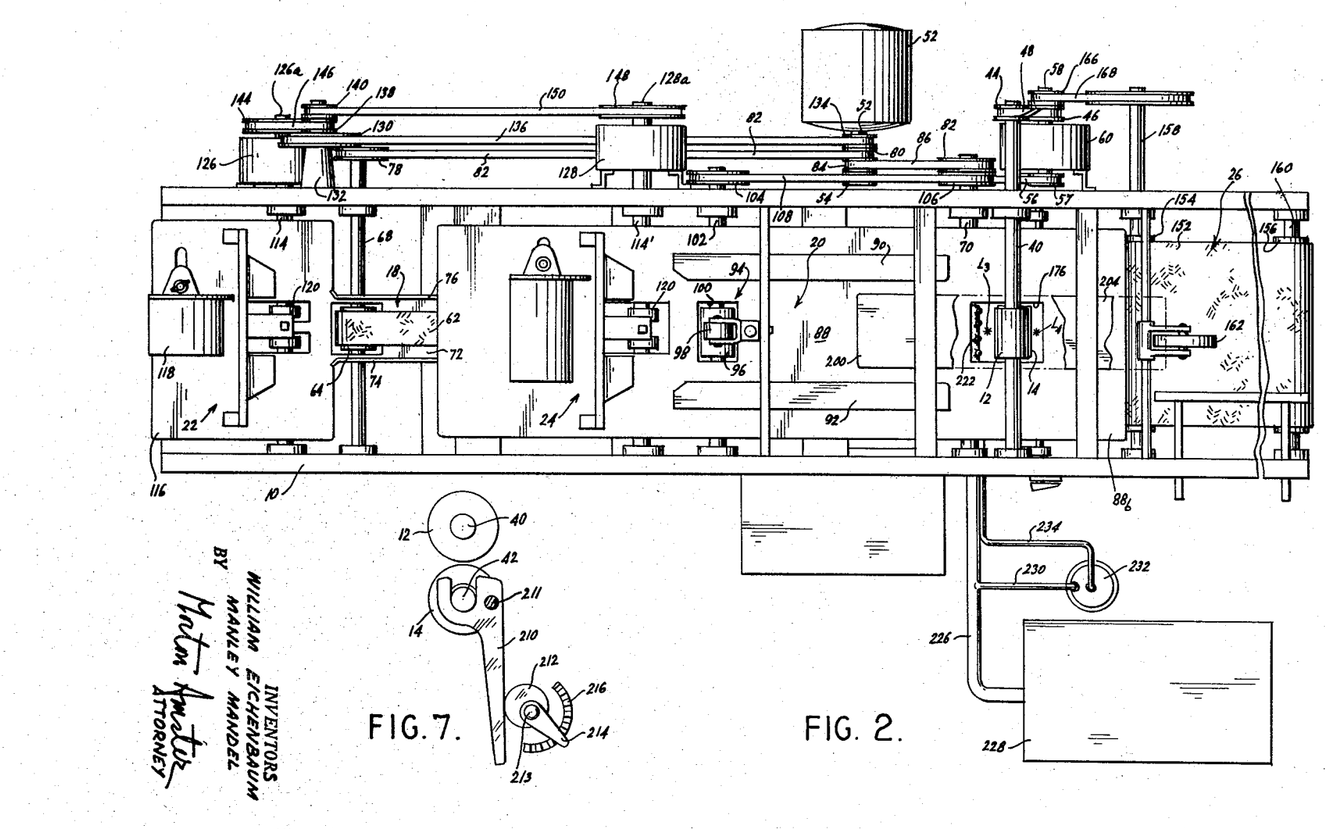
Fig. 2 is a plan view of the duplicating machine of the present invention, with parts broken away in the interest of clarity.
Fig. 7 is a detailed elevation showing mechanisms for pressure control of the duplicating rollers.
Figures 3, 8:
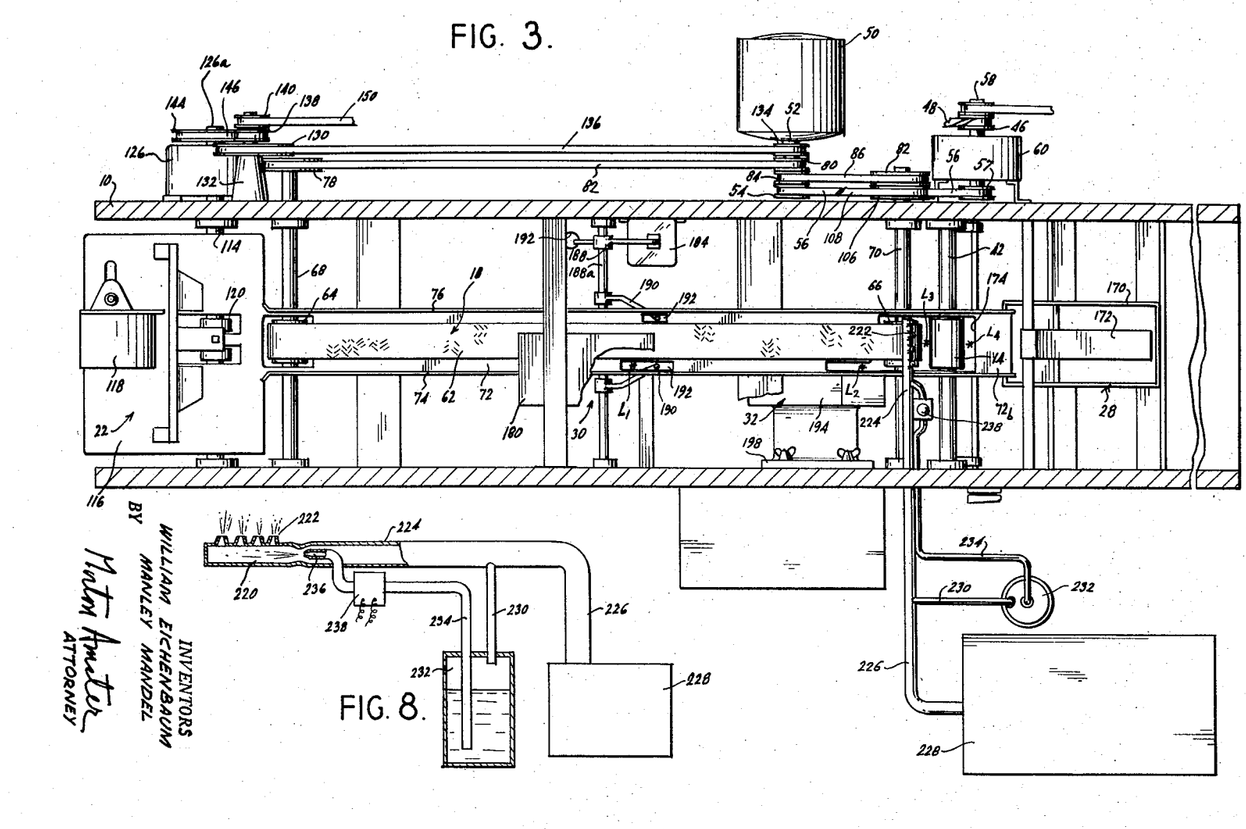
Fig. 3 is a sectional view taken substantially along the line 3—3 of Fig. 1 and looking in the direction of the arrows, with parts broken away in the interest of clarity.
Fig. 8 is an elevational view with parts broken away and sectioned, showing the details of the spray or wetting system forming part of the duplicating or addressograph apparatus.
Figure 4:
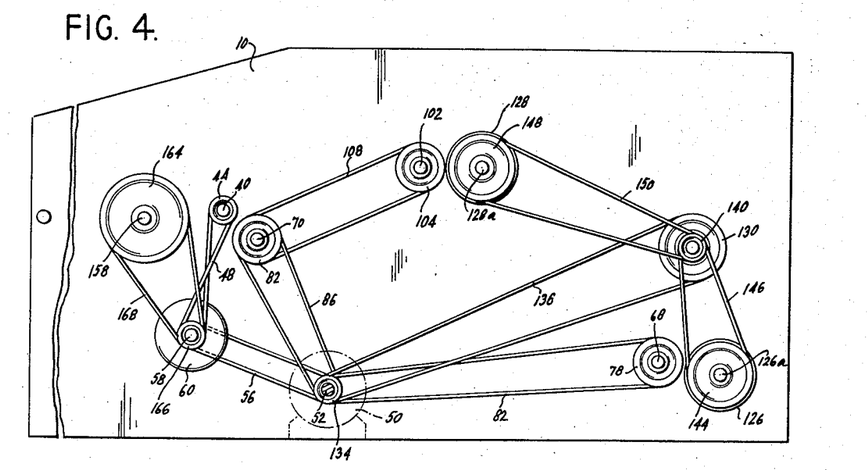
Fig. 4 is a rear elevational view, with parts broken away, showing the details of the drives for the duplicating apparatus shown in Figs. 1 to 3 inclusive.

Turning now to Figs. 1 to 3, inclusive, the details of the machine will be described. The duplicating or reproducing rollers 12, 14 are supported on transversely-extending shafts 40, 42 which are journaled on the frame 10 of the machine. The duplicating roller shaft 40 extends through the back wall of the frame 10 and as seen in Fig. 4 is coupled to the magnetic clutch 60 by means of pulleys 44, 46 and a crossed-over endless V-belt 48. Drive for the upper and lower rollers 12, 14 the upper one of which may be steel and the lower one of which may be rubber, is obtained from a motor 50 which has an output shaft 52 coupled by a pulley 54, belt 56 and pulley 57 to the input shaft 58 of the magnetic clutch 60. Thus upon operation of the magnetic clutch 60, drive is provided from the motor 50 to the printing rollers 12, 14.

As seen in Figs. 1 and 3, the feed path 18 which is upwardly inclined from the master card feeder 22 toward the pick-up location 16 includes an endless belt conveyer 62 which is trained about transversely-extending end rollers 64, 66 which in turn are carried by shafts 68, 70 journaled on the frame of the machine. In association with the endless belt 62 of the feed path 18 is a bed plate 72 having upstanding lateral flanges 74, 76. As seen best in Fig. 1, the bed plate 72 generally underlies the upper run of the endless belt conveyer 62 while the flanges 74, 76 are disposed at opposite sides of the upper run along which the masters M are advanced. The spacing of the flanges 74, 76 relative to each other is selected such that the flanges laterally confine the master M in their travel from the feeder 22 toward the pick-up location 16. Although not specifically shown, it is within the contemplation of the invention that the flanges 74, 76 be laterally adjustable in relation to each other and to a longitudinal medial plane of the belt 62 such that various width masters may be employed with equal facility. The shaft 68 is driven from the output shaft 52 of the motor 50 by a belt and pulley coupling including pulley 78 on the shaft 68, an aligned pulley 80 on the motor shaft 52, and the belt 82 trained about the pulleys 78, 80. The shaft 70 is driven from the motor shaft 50 by a further belt and pulley coupling including pulley 82 on shaft 70, pulley 84 on shaft 52 and the V-belt 86 trained over the pulleys.

The feed path 20, which is downwardly inclined from the blank card feeder 24 toward the pick-up location 16, includes a substantially continuous metallic feed bed 88 having a smooth upper surface and parallel stop members 90, 92 defining the lateral limits of the feed path along which the blanks B move toward the pick-up location 16. In the illustrative form of the invention, the lateral confining members or elements 90, 92 are elongated bars of permanently magnetized material which are supported on the bed 88 at a spacing dependent on the width of the blanks B placed in the feeder 24.

Along the feed path 20 in advance of the feeder 24 is a flick drive 94 which includes cooperating rollers 96, 98 which have a peripheral contact substantially in the plane of the upper surface of the feed bed 88. To this end a suitable transverse cut-out 100 is formed in the bed 88 such that a predetermined momentum may be imparted to the blanks B after leaving the feeder 24 and after being placed in motion along the feed bed 22 toward the pick-up location 16. The lower flick roller 96 is supported on a transverse shaft 102 which is coupled to the supporting shaft 70 for the end roller 66 of the endless conveyor 62 by a belt and pulley coupling including pulley 104 on shaft 102, an aligned pulley 106 on shaft 70 and the belt 108 trained over the aligned pulleys. Accordingly the flick roller 96 is driven from the motor 50 along with the end rollers 64, 66 of the endless conveyor 62. The upper flick roller 98 is biased into contact with lower flick roller 96 for drive therefrom through provision of an appropriate mounting bracket 110 including a biasing spring.

The feeders 22, 24 for delivering successive masters M and impression-receiving blanks B may be of any known construction and are illustrated as the well-known Pitney-Bowes kicker-type feeder. The lower feeder 22 includes a sectoral kicker member 112 mounted on a shaft 114 extending transversely of the machine. The kicker member 112 extends upwardly through appropirate cut-outs formed in the feed plate 116 which extends horizontally and terminates at the input end of the feed path 18 to deliver the masters onto the upper run of the conveyer belt 62. On the feed plate 116 is an adjustable prop 118 which maintains a stack of masters M in position for delivery to the conveyer 62. Appropriate resilient hold-down mechanisms 120 are associated with the kicker member 112 such that the kicker is effective during each cycle of rotation of the shaft 114 to advance the lowermost master of the stack or pile in the feeder 22 toward the conveyor 62. The upper feeder 24 is for all intents and purposes identical to the lower feeder 22 except that the feed plate 116' is in coplanar relation with the feed bed 88 and forms a continuation thereof. Accordingly the respective parts of the feeder 24 have been designated by the same reference numerals with primes applied thereto.

Drive for the feeders is obtained from the motor 50 through belt and pulley couplings and respective magnetic clutches 126, 128. Specifically, and as seen best in Figs. 2 and 4, an intermediate pulley 130 is supported on an appropriate bearing 132 at a location above the magnetic clutch 126 which is connected to the bottom feeder. The pulley 130 which serves as a speed reduction coupling is connected to a further pulley 134 on the motor shaft 52 by an endless belt 136 trained over the pulleys 130, 134. The shaft for the reduction pulley 130 carries further pulleys 138, 140. The pulley 138 is coupled to an aligned pulley 144 on the input shaft 126a of the magnetic clutch 126 for the bottom feeder 22 by a further belt 146. The pulley 140 is coupled to the input shaft 128a of the magnetic clutch 128 for the top feeder 24 by a pulley 148 and a belt 150. Thus selectively controllable couplings are provided between the motor 50 and the respective kicker shafts 114 and 114' of the feeders 22, 24 whereby drive may be selectively imparted to the respective feeders in dependence upon the condition of the magnetic clutches 126, 128.

The stacker 26 which receives the blanks after imprinting thereon includes a horizontally extending endless conveyer 152 which is trained about supporting rollers 154, 156 secured to shafts 158, 160 respectively. The shafts 158, 160 are journaled transversely of the machine and are spaced apart to provide a comparatively long stacker run for receiving blanks after the duplicating operation. Associated with the upper run of the stacker is a hold-down roller 162 which may be appropriately biased, as by provision of a spring. Drive is imparted to the stacker conveyor 26 through provision of a belt and pulley coupling to the input shaft of the magnetic clutch 60. Specifically and as seen in Fig. 4 a pulley 164 is secured to the shaft 158, an aligned pulley 166 is secured to the input shaft of the magnetic clutch 60 and a V-belt 168 is trained over the aligned pulleys.

The master-receiving bin or hopper 28 is disposed beneath the stacker 26 and in a position to receive successive masters M from the printing rollers 12, 14. The bin-type stacker 28 includes a receptacle 170 and a spring-biased hold-down finger 172 in position to deflect successive masters downwardly, as seen in Fig. 1. In the regions adjacent the reproducing or printing rollers 12, 14, there is provided a positive guiding arrangement for duplex separation of the blanks B and masters M. As may be appreciated by conjoint reference to Figs. 1 and 5, the terminal ends 74a, 76a of the lateral confining members 74, 76 of the lower feed path 18 are cut away at regions immediately forward of the pick-up location 16 and the feed bed 88 merges at its terminal end toward the tangential contact between the printing rollers 12, 14. In the regions immediately preceding and following the rollers 12, 14 suitable windows 174, 176 are provided in the respective feed beds 72, 88 such that the masters and blanks may be appropriately exposed to the electrical sensing units 32, 34, 36 and to each other for the duplicating operation. The width of the windows or openings 174, 176 provided in the feed beds 72, 88 is selected to expose a given width of the masters and blanks in face-to-face relation. However, in that the windows 174, 176 are of a much smaller width than the over-all width of the blank stock, for example envelopes, the blank stock will definitely pass along the upwardly inclined terminal portion 88b of the upper feed bed 88 and onto the stacker 26 after duplication. Similarly the masters will pass onto the downwardly-inclined terminal portion 72b of the lower feed bed 72 and into the bin or stacker 28. Thus a positive guide path is provided for the masters along the upper run of the endless conveyer 62 through the duplicating rollers 12, 14, over the downwardly-inclined terminal portion 72b of the feed bed and finally into the stacker 28; and similarly a positive guide path is provided for the blanks along the downwardly inclined feed bed 88 to the duplicating rollers 12, 14 along the upwardly-inclined terminal portion 88b of the feed bed and onto the stacker 26.

Figure 6:
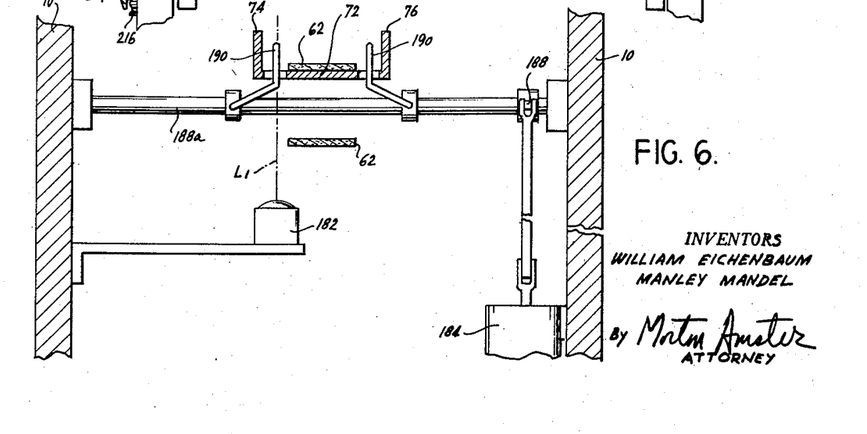
Fig. 6 is an enlarged sectional view, with parts broken away, taken substantially along line 6—6 of Fig. 1.

Referring now to Figs. 1 and 6, the details of the checking station 30 along the lower or master feed path 18 will now be described. Specifically a photoelectric unit 180 is disposed above the upper run of the conveyer 62 and a light source 182 is disposed below the conveyer 62. As seen best in Fig. 3 the light source 182 is offset laterally with respect to the endless conveyer 62 but within the limits defined by the lateral-confining elements 74, 76 such that the light beam $L_1$ which extends across the upper run of the conveyer can be broken by the movement of the master M along the upper run toward the pick-up location 16. As will appear from a description of the control circuit shown in Fig. 9, the interruption of the light beam $L_1$, indicating the presence of a master at the check station 30, is effective when a blank B is at the pick-up location to energize a pull-type solenoid 184 which has its plunger 186 connected to a rockable lever 188 carrying blocking fingers 190. The blocking fingers 190 extend through opening 192 and are normally biased into blocking relation with the feed path 18 on opposite sides of the endless belt 62 by provision of a biasing spring 192 connected to the rockable lever 188. Upon pull-down of the solenoid plunger 186, the lever 188 is rocked about its pivot 188a in a clockwise direction and the blocking fingers 190 are moved from their obstructing position. The interruption of the light beam $L_1$ from the photoelectric unit 180 further is effective to discontinue feed by the lower feeder 22 through the magnetic clutch 116. The details of such control will become apparent upon consideration of the schematic diagram of Fig. 9. The timing of the removal of the blocking members 190 in response to the sensing of a master M at the check station 30 by interruption of the light beam $L_1$ is such that the blocking members are removed from the feed path 18 whenever a master is effective to interrupt the light beam $L_1$. In other words, the blocking members or fingers 190 will obstruct the lower feed path 18 and interrupt normal operation only in the event that a blank is not delivered to the pick-up location 16. The location of the check station in relation to the pick-up point 16 is at approximately the same spacing as the upper feeder 24 in relation to the pick-up point. In the event that a compact machine is to be constructed with the lower feeder 22 immediately beneath the upper feeder, space considerations virtually dictate that the masters be fed upwardly toward their feed path and the blank be fed downwardly toward their feed path, thus necessitating inversion of the masters after duplication. Thus, the arrangement illustrated in Fig. 1, with the lower feeder 22 spaced at a greater distance from the pick-up location 16 than the upper feeder 24 facilitates the use of similar feeders and eliminates the need of inverting the masters after duplication to restore the initial stacked order.

The electrical sensing system 32 is disposed along the lower feed path 18 at a location immediately adjacent the pick-up point 16. This electrical sensing system is effective to condition part of a dual control circuit for initiating operation of the duplicating rollers 12, 14 and includes a photoelectric unit 194 which is energized from a light source 196 disposed above the endless conveyer 62 and provides a beam $L_2$ across the conveyer. Once again and as seen best in Fig. 3, the light beam $L_2$ is laterally offset from the conveyer 62 but is at a location where it is interrupted as the masters advance toward the pick-up location 16. The photoelectric unit 194 is supported on an adjustable bracket, shown in phantom in Fig. 1 and designated by the numeral 198, such that the sensing position of $L_2$ may be adjusted in relation to the pick-up location 16 to obtain various positions of registry between masters and blanks, as will appear hereinafter.

The electrical sensing system 34 includes a photoelectric unit 200 which is energized from a light source 202 disposed beneath the printing rollers 12, 14. The assembly 200, 202 is effective to produce a light beam $L_3$ substantially medially of the conveyer intermediate the end roller 66 and the printing rollers 12, 14, the location of the beam $L_3$ being best seen in Fig. 3. The photoelectric sensing system 34 is effective to interrupt operation of the feeder 24 through the magnetic clutch 128 and is further effective to initiate drive of the duplicating rollers 12, 14 conjointly with the electrical sensing system 32.

The electrical sensing system 36 includes a further photoelectric unit 204 which, in conjunction with light source 206 produces a light beam $L_4$ which is effective to maintain operation of the printing rollers 12, 14 until the trailing ends of the masters and blanks have passed the location $L_4$, thus assuring that an operation is completed preliminary to interruption of drive to the rollers 12, 14. The presence of the photoelectric sensing system 204 which produces the light beam $L_4$ is optional and may not be needed as will appear hereinafter.

Figure 5:
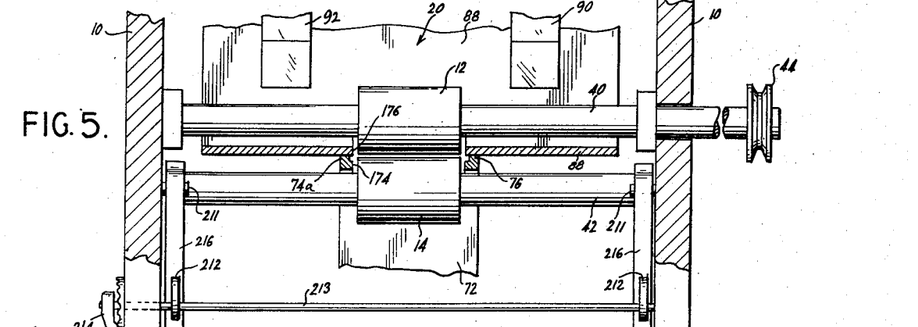
Fig. 5 is a sectional view, on an enlarged scale and with parts broken away, taken substantially along the line 5—5 of Fig. 1.

As seen in Fig. 5 and in Fig. 7 pressure on the printing rollers 12, 14 may be selectively adjusted by provision of a rockable arm 210 pivoted at 211 and cradling the shaft 42 of idler 14. The arm 210 is cammed into various positions by camming elements 212 rotatably supported on shaft 213 which is rotated manually by a handle 214 riding along a rack 216. Thus the pressure between the rollers 12, 14 may be adjusted in accordance with the type of stock being used and other considerations well understood in the duplicating art.

As a feature of the invention, automatically actuated spraying mechanisms are disposed along the upper feed path 88 for wetting a portion of the blank B which is to receive the hectograph impression. Specifically, the spraying mechanisms include a head 220 which is disposed across the window opening 176 in the feed bed 88, the head 220 being of a width sufficient to wet a predetermined swath of the blank. The details of the spraying or wetting mechanisms may be best appreciated by reference to Fig. 8 wherein there is shown the head which is formed with upwardly directed nozzles 222 and joined to a fluid manifold 224 at a throat of a Venturi. The fluid manifold is connected by a conduit 226 to a compressor 228 and is connected by a further conduit 230 to a liquid container or reservoir 232. The liquid container 232 has a standpipe 234 extending vertically thereof and having an inlet end approximately to the bottom of the container. The standpipe 234 terminates in a jet head 236 arranged concentrically of the manifold 224 adjacent the throat and directed toward the nozzles 222. In the standpipe 234 in advance of the jet head 236 is a solenoid-controlled valve 238 which is connected in the circuit of Fig. 9 such that the spray head is effective for a selected interval. This interval determines the length of the area of the blank which is wet, the width being predetermined by the width of the spray area defined by the nozzles 222. The compressor 228 which communicates through the manifold 226 with the spray head 220 and through the pressure conduit 230 with the liquid reservoir 232 assures that the standpipe 234 at locations behind the solenoid-control valve 238 are always filled with fluid. Thus upon opening of the valve 238, there will be instantly available at the head 222 a supply of fluid which is atomized by the air stream of the pressure manifold 226.

Figure 9:
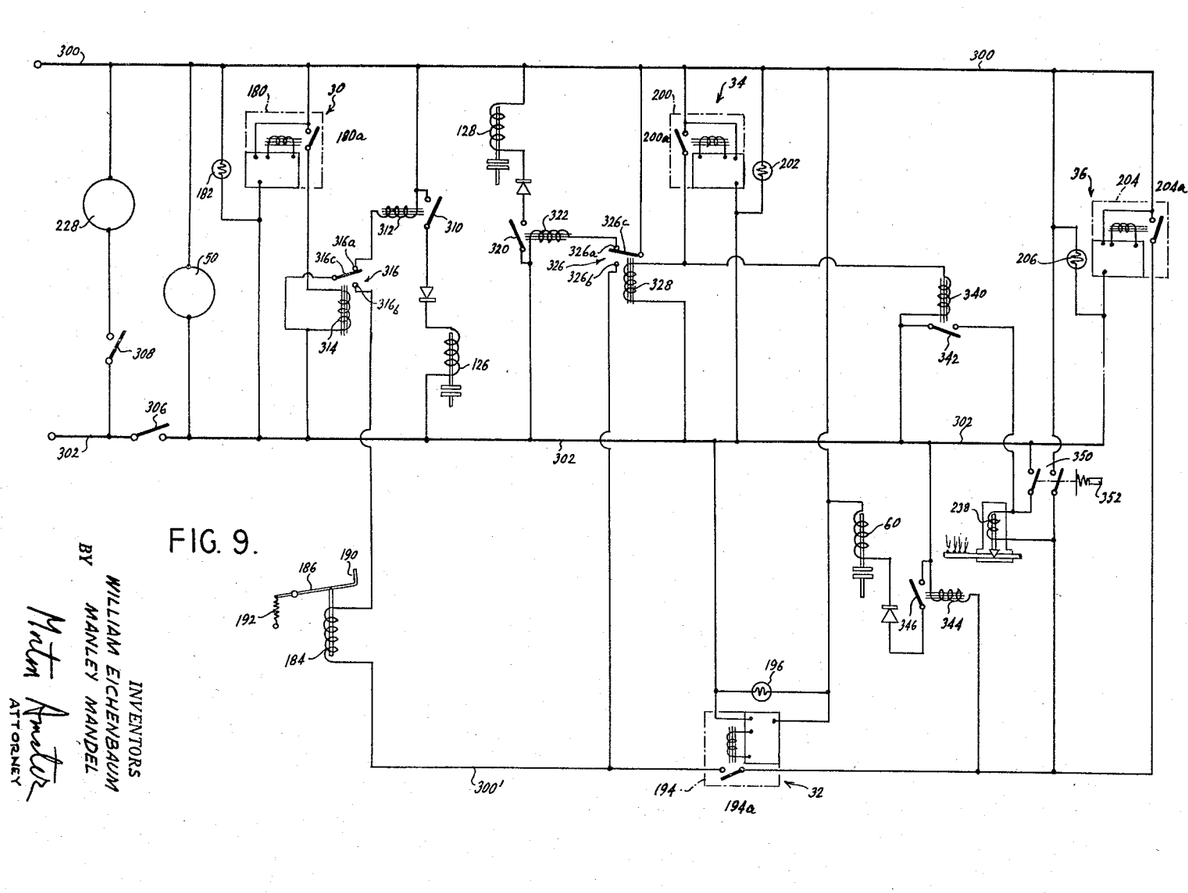
Fig. 9 is a schematic diagram showing a presently preferred control and sensing circuit embodying features of the present invention.

Referring now specifically to Fig. 9, there is shown the control and sensing circuit incorporating diagrammatically the various electrically controlled components of the present duplicating apparatus. In Fig. 9, all relay switch solenoids are in their normal position, that is, the position with no current applied. Conventional symbols are employed in each instance, and the magnetic clutches and photoelectric units are diagrammatically illustrated such that the interconnection and operation of the control and sensing circuit may be best understood. The photoelectric units 180, 194, 200 and 204 of the electrical sensing systems 32, 34, 36 each include switches 180a, 194a, 200a and 204a which are closed in response to interruption of their respective light beams $L_1$, $L_2$, $L_3$, and $L_4$. Such photoelectric units are readily available on the open market and normally include a conventional thyratron control tube having a relay in its plate circuit which is effective to close the respective relays. The magnetic clutches 126, 128 and 60 are likewise of conventional structure, except that they are arranged to operate from a source of direct voltage. Accordingly, the respective magnetic clutches have been diagrammatically illustrated as an appropriate rectifier arranged to deliver D.C. current to an internal solenoid.

A line source of alternating potential is connected to the input lines 300, 302, a further input line 300' being shown to afford a convenient basis for an understanding of the circuit. As will subsequently become appreciated, the input line 300' is effectively connected to the input line 300 incident to preliminary circuit operation and conditioning. A main control switch 306 is connected in the line 302, while a further control switch 308 is connected in series with the compressor 228, the compressor and switch being connected across the lines 300, 302. The motor 50 is connected across the lines 300, 302 and is placed in operation by closing of the main switch 306.

The magnetic clutch 126 for the lower feeder 22 is connected across the lines 300, 302 and is effective to impart drive to the lower feeder in response to closing of the series-connected switch 310 which is controlled from a relay 312. The relay 312 has its coil connected between the line 300 and one terminal 316a of a two-position switch 316 which has its other terminal 316b connected to one side of the solenoid control 184 for the blocking fingers 190. The contactor 316c of the switch 316 is connected to the line 302 and when the switch 316 is in the position illustrated, that is with the contact 316c on the terminal 316a, an energization path is provided for the relay 312. Thus, in response to closing of the switch 306, the bottom feed clutch 126 is engaged through energization of the coil 312 from the line 300, through the terminal 316a, the contactor 316c and to the line 302. Operation of the magnetic clutch 126 and drive of the feeder 22 advances a master card onto the continuous conveyer 62 toward the check station 30.

The top feeder 24 is controlled from the magnetic clutch 128 and is actuated by closing the switch 320 which is controlled from relay 322 energized from the line 300 over the contactor 326c of the switch 326, through the terminal 326a and to the line 302. Accordingly, at the start of operation, the relay 320 closes to deliver a blank B along the top feeder to the flick rollers 96, 98. The flick rollers 96, 98 are constantly turning and the blank is advanced toward the pick-up location 16 and rests against the entry mouth defined by the cooperating rollers 12, 14. In that the magnetic clutch 60 of the duplicating roller drive is not energized, the rollers 12, 14 are stationary. Incident to the blank arriving along the feed path 20 at the pick-up location 16, the light beam L₃ for the sensing system 34 is interrupted. Thus, in the photoelectric unit 200, the switch 200a is closed which applies current to the relay 328 controlling the two-position switch 326. In response to interruption of the light beam L₃, the switch 326 is changed over to the position in which the contactor 326c engages the terminal 326b thus connecting line 300 to line 300'. Interruption of the light beam L₃ may occur in advance of interruption of the light beam L₁ by the master arriving at the check station, and accordingly, the switch 180a of the photoelectric unit 180 at the check station 30 is open. With respect to the blocking fingers 190 at the check station 30, the same are still in the straddling position to the feed path 18 in that the solenoid 184 is not energized. However, one terminal of the solenoid 184 is connected to the line 300 via the line 300' and the circuit provided over the terminal 326b of the switch 326.

Thus, upon the master M coming into the check station 30 and interrupting the light beam L₁, the switch 180a is closed and an energization circuit is provided for the relay 314 which switches its two-position switch 316 into the position in which the contactor 316c engages the terminal 316b and connects the line 302 to the solenoid 184. Accordingly, by conjoint interruption of the light beams L₁, L₃, solenoid 184 is connected across the lines 300, 302 which withdraws the blocking fingers 190 from the bottom feed path 18. This withdrawal occurs almost instantaneously with interruption of the light beam L₁ by the leading end of the master after the circuit is conditioned by interruption of light beam L₃ and thus blocking fingers 90 are retracted from the bottom feed path 18 to allow unimpeded flow of masters during proper operation.

When the master M arrives at the pick-up location 16, the leading end of the same interrupts the beam L₂ of the sensing system 32 to close the switch 194a of the photoelectric unit 194. Closing of the switch 194a connects the line 300' which is coupled to the line 300 to one side of the relay 344 which controls the switch 346 of the magnetic clutch 60. The other side of the relay 344 is connected directly to the line 302 and accordingly the magnetic clutch is effective to institute drive to the printing rollers 12, 14. Thus, closing of switch 194a begins the required duplicating operation.

With respect to the coordination and control of the spray unit, the solenoid of the control valve 238 has one side connected to the line 300' and has its other side connected to the switch 342 which is connected to the line 302. The switch 342 in turn is controlled from the relay 340, the field coil of which is energized by closing of the switch 200a of the photoelectric unit 200. In that the switch 200a closes when the blank arrives at the pick-up location 16, the switch 342 is closed as the master progresses upwardly along the conveyer toward the sensing system 32. Thus, upon closing of the switch 194a, the solenoid 238 is energized to cause a spray of fluid to be directed upwardly toward the under face of the blank which is to receive a hectograph impression in the area defined by the lateral extent of the spray head 220. Paralleling the energization circuit for the solenoid 238, which is closed only when the switch 342 and the switch 194a are closed, is a double-pole switch 350 which has a spring biased push button control 352 serving as a priming circuit for the spray system at the start of operation. In response to depression of the push button control, the double-pole switch 350 is closed, thus connecting the solenoid 238 directly across the line to bring the fluid up into the stand pipe 234 and prepare the spray system for instantaneous operation under control of the blank and master sensing system.

The electrical sensing system 36 which follows the printing rollers 12, 14 includes a photoelectric unit 204 having its switch 204a connected to apply operating potential to one side of the relay 344 for the magnetic clutch 60. In response to closing of the switch 204a upon interruption of the light beam L₄, an auxiliary circuit is provided to continue operation of the magnetic clutch 60 despite the fact that the light beam L₂ may be broken incident to the trailing end of the master passing the sensing line or location L₂. As a practical matter, the blanks, which are envelopes, are much longer than the masters, and the situation may well arise that the trailing end of the master leaves the sensing unit 32 in advance of the trailing end of the blank leaving the sensing unit 34. In such an eventuality, and if there is not sufficient inertia to provide drive to the printing rollers 12, 14, the registering master and blank will not pass completely through the printing rollers 12, 14, but will be stopped part way through. To this end, the photoelectric unit 36 takes over control of the drive to the printing rollers 12, 14 until such time as the trailing end of both the masters and blanks pass beyond the sighting line of the light beam L₄ and are delivered to the respective sorting mechanisms 26, 28.

Figure 10:
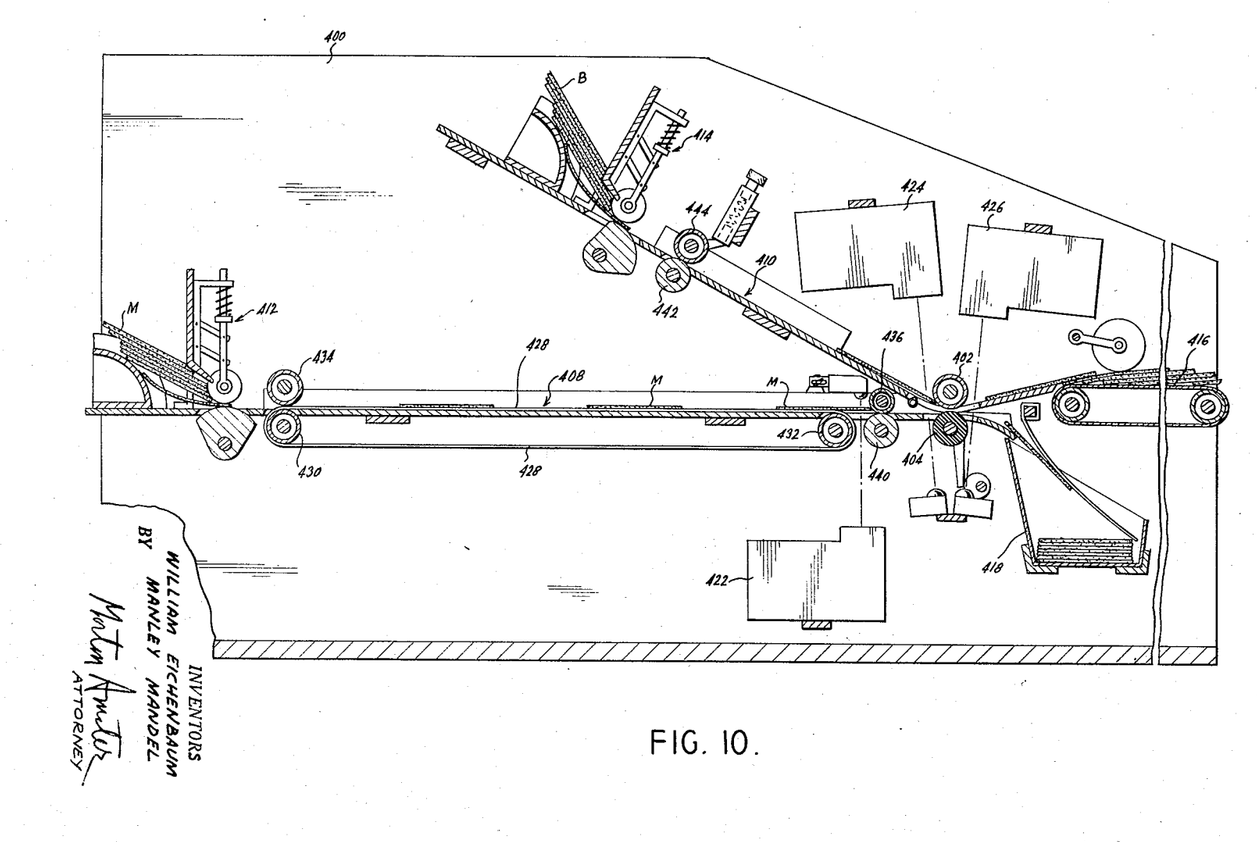
Fig. 10 is a longitudinal sectional view showing a modified duplicating machine or addressograph embodying further features of the present invention.
Figures 11, 12:
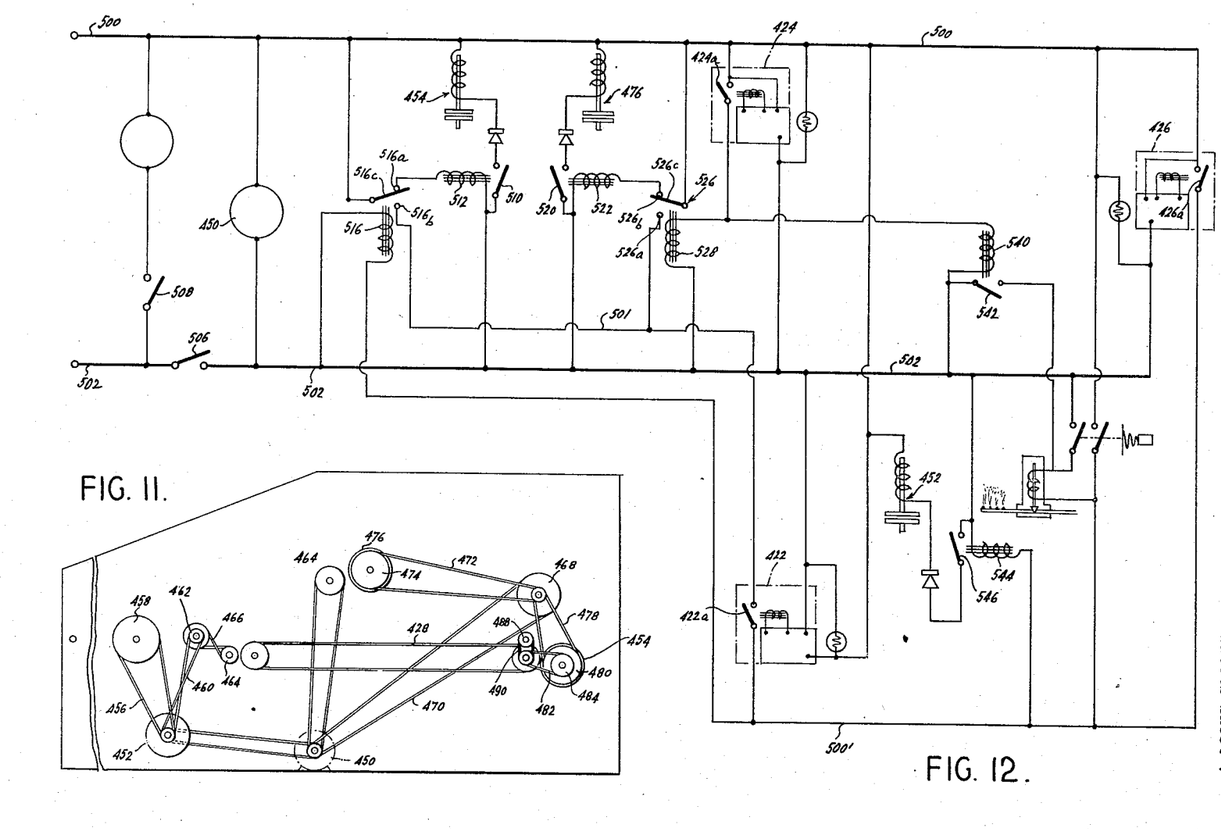

Referring now specifically to Figs. 10 to 12 inclusive, there is shown a modified duplicating or addressograph machine embodying features of the invention which includes a frame 400, cooperating duplicating or printing rollers 402, 404 which are adapted to receive blanks B and masters M at a printing or pick-up location adjacent the tangential or peripheral contact of the rollers 402, 404, individual feed paths 408, 410 which converge toward the pick-up location in advance of the printing rollers 402, 404, and respective delivery mechanisms 412, 414 for feeding the masters and blanks along the converging feed paths 408, 410.

Trailing the printing or duplicating rollers 402, 404 is a stacker system 416 which receives the successive blanks B while beneath the stacker 416 is a storage bin 418 which receives successive masters M.

Adjacent the printing rollers 402, 404 are electrical sensing units 422, 424, 426 which are arranged to control the operation of the respective feeders 412, 414, printing rollers and associate mechanisms. The sensing units 422, 424 control the operation of the printing rollers in dependence upon coincident delivery of masters and blanks to respective pick-up locations, while the electrical sensing unit 426 continues the duplicating operation until the trailing ends of a master and blank clear the duplicating rollers. Structurally the modified form of the invention is very similar to the form illustrated in Figs. 1 to 8 inclusive, except that the check station and mechanisms associated therewith have been omitted, and the operation of the master feeder 412 and associated mechanisms have been changed such that the delivery of the masters along the feed path 408 is controlled by the electrical sensing unit 422.

The feed path 408 includes an endless belt conveyer which is trained about transversely-extending end rollers 430, 432. The feeder 412 associated with the endless conveyer 428 is similar in all respects to the feeder 22 and accordingly will not be described any further. At the input end of the endless belt conveyer 428 is a flick roller 434 which is in tangential contact with and driven from the end roller 430 of the endless belt conveyer 428. At the output end of the endless conveyer 428 are a pair of flick rollers 436, 440 which serve as a check location in advance of the duplicating rollers 402, 404.

The upper feeder 414 is the same in all material respects to the upper feeder 24, as well as the mechanism along the upper feed path 410 which includes the flick rollers 442, 444.

Referring now to Fig. 11, the coordination of the respective parts of the modified duplicating apparatus will be best appreciated. Drive for the respective feeders is obtained from a motor 450 connected through respective belt and pulley couplings and magnetic clutches 452, 454 and 376. The magnetic clutch 452 controls operation of the stacker 416, the print rollers 402, 404 and the check and flick roller 436 and is driven from pulley 480. Specifically, the output shaft of the magnetic clutch 452 is connected by a belt and pulley coupling 456, 458 to the stacker, a further belt and pulley coupling 460, 462 to one of the print rollers and by further belt and pulley coupling 464, 466 to check and flick roller 436. Thus upon energization of the magnetic clutch 452, drive is imparted to the flick rollers 436, 440 as well as to the duplicating rollers 402, 404 and the stacker 416. The motor 450 is connected to an intermediate drive pulley 468 by a belt 470, the intermediate pulley 468 being connected by a further belt and pulley 472, 374 to the magnetic clutch 476 for the top feeder 414 and by a further belt and pulley coupling 478, 480 to the clutch 454 of the bottom feeder. The output shaft of the magnetic clutch 454 is connected by a belt and pulley coupling 482, 484, 486 and by belt and pulley 488, 490 to drive the endless belt conveyer 428 as well as the input roller 434.

The details of the operation of the modified form of the invention will be best appreciated by reference to the schematic diagram of Fig. 12 wherein there is shown the control or sensing circuit for the modified duplicating apparatus. In Fig. 12 all relay switch solenoids are in their normal position, that is the position with no current applied. Conventional symbols are employed in each instance and the magnetic clutches and photoelectric units are diagrammatically illustrated such that the interconnection and operation of the control and sensing circuit may be best understood. The electrosensing systems 422, 424 and 426 each include photoelectric units as aforesaid having switches 422a, 424a and 426a closable in response to interruption of the respective light beams. The magnetic clutches 452, 454 and 476 are likewise of conventional structure as previously described.

A line source of alternating potential is connected to the input lines 500, 502 and a further input line 500'. As previously described the input line 500' is effectively connected to the input line 500 incident to preliminary circuit operation and conditioning. A main control switch 506 is connected to the line 502 while a further control switch 508 is connected in series with the compressor motor as aforesaid. The motor 450 is connected across the line and placed in operation by closing of the main switch 506.

The magnetic clutch 454 for the bottom feeder 412 is connected across the lines 500, 502 and is effective to impart drive to the lower feeder in response to the closing of the series connected switch 510 which is controlled from the relay 512. The relay 512 has its coil connected between the line 502 and one terminal 516a of a two-position switch 516 which has its other terminal 516b connected to the normally open switch 422a of the photoelectric unit 422. The contactor 516c of the switch 516 is connected to the line 500. In response to closing of the switch 506, the bottom feed clutch 454 is engaged through energization of the coil 512. Operation of the magnetic clutch 454, drive of the feeder, operation of the flick roller assembly which consists of the roller 434 and the end roller 430 of the conveyer, and operation of the conveyer advances master cards in succession along the horizontally-extending feed path toward the check rollers 436, 440.

The top feeder 414 is controlled from the magnetic clutch 476 and is actuated by closing the switch 520 which is controlled from relay 522 energized from the line 500 over the terminal 526a and contactor 526c of switch 526. Accordingly, at the start of operation, the relay 520 closes to deliver a blank from the top feeder to the flick rollers 442, 444. The flick rollers 442, 444 are constantly turning and the blank is advanced toward the pick-up location adjacent the entry mouth defined by the cooperating rollers 402, 404. In that the magnetic clutch 452 of the duplicating roller drive is not energized, the rollers 402, 404 are stationary.

Incident to the blank arriving along the upper incline feed path 410 at the printing rollers 402, 404, the light beam associated with the unit 424 is interrupted, thus closing the switch 424a. Closing of the switch 424a applies current to the relay 528 controlling the two-position switch 526. In response to interruption of the light beam of the unit 424, the switch 526 is changed over to the position in which the contactor 526c engages the terminal 526b, thus connecting the line 500 to the line 501. Line 501 in turn is connected to the line 500' upon closing of the switch 422a associated with the photoelectric unit 422.

When the master arrives at the check location adjacent the check and flick rollers 436, 440, the leading end of the master interrupts the beam associated with the unit 422 closing the switch 422a. Closing of the switch 422a connects the line 501 to the line 500' which controls the relay 544 of the switch 546 associated with the magnetic clutch 452. As previously described, the other side of the relay 544 is connected to the line 502 and accordingly the magnetic clutch is effective to institute drive to the printing rollers 402, 404 as well as to the flick and check rollers 436, 440. Thus the closing of the switch 422a initiates the required duplicating operation. When the relay 528 is effective to operate the switch 526 operation of the top feeder is discontinued; likewise upon closing of the switch 422a the relay 516 is energized interrupting operation of the bottom feeder.

The operation of the spray unit is the same as previously described and accordingly will not be detailed. It suffices to point out that the switch 542 which is controlled from the relay 540 energizes the solenoid of the spray unit to cause the fluid to be directed upwardly to the underface of the blank which is to receive the hectograph impression.

The electrical sensing unit 426 which has its beam directed at a location following the printing rollers has its switch 426a connected to apply operating potential to one side of the relay 544 for the magnetic clutch 452. In response to closing of the switch 426a upon interruption of the light beam associated with the unit 426, an auxiliary circuit is provided to continue energization of the magnetic clutch 452 despite the fact that the light beam of unit 422 may be broken incident to the trailing end of the master passing the sensing line or location.

In actual operation with the embodiment illustrated in

Figs. 10 to 12 inclusive, the masters will be placed along the upper run of the conveyor 428 at selected intervals, and the spacing of the blanks will be determined by the drives imparted to the respective parts of this feed and conveying system. The presence of a number of masters along the lower feed path is a material aid in establishing high speed operation. When the advanced or leading master is delivered to the printing rollers 402, 404 by the check and feed rollers 436, 440 the leading end of the master is engaged by the rollers 402, 404 which have much greater pressure contact than the rollers 436, 440. Thus the master is effectively taken over by the printing rollers 402, 404 despite the fact that trailing portions may still be engaged between the flick rollers 436, 440. Still further the spacing of the rollers 436, 440 with respect to the rollers 402, 404 and the speed of the conveyor, as well as other variables, may be coordinated such that the duplicating operation is completed for a master and the check and printing rollers brought to a halt preliminary to the next succeeding master arriving at the check location. Thus although the system is substantially continuously in operation, reliability is assured in duplicating but a single master with a single blank.

Although only two forms of the invention have been illustrated, a latitude of substitution is intended and in certain instances some features of the invention may be used without a corresponding use of other features. Accordingly the appended claims should be accorded an interpretation consistent with the disclosure.

What we claim is:

1. In a duplicating machine, cooperating reproducing rollers for transfer of an impression from a master to a blank, a drive for imparting rotary motion to said reproducing rollers, means for selectively coupling said drive to said reproducing rollers, separate feed paths for delivering masters and blanks to said reproducing rollers, a feeder along each of said feed paths, actuating means for each of said feeders, means along said separate feed paths for sensing arrival of a master and blank at respective check points relative to said reproducing rollers, the sensing means jointly controlling the selective coupling means whereby rotary motion is imparted to said reproducing rollers when a master and blank are sensed at said check points, and means responsive to the respective sensing means arranged to disable the actuating means for the associated feeder when a master or blank arrives at its check point.

2. In a duplicating machine, cooperating reproducing rollers for transfer of an impression from a master to a blank, a drive for imparting rotary motion to said reproducing rollers, means for selectively coupling said drive to said reproducing rollers, separate feed means for delivering masters and blanks along converging feed paths to said reproducing rollers, actuating means for controlling each of said feed means, photoelectric means along said feed paths for sensing arrival of a master and blank at check points relative to said reproducing rollers, means responsive to the photoelectric means for jointly controlling the selective coupling means whereby rotary motion is imparted to said reproducing rollers when a coinciding master and blank are sensed at said reproducing rollers, and means responsive to the respective photoelectric means for individually controlling the actuating means for the respective feeders whereby feeding action is interrupted when a master or blank arrives at its check point.

3. A duplicating machine comprising reproducing rollers for bringing hectograph masters and impression-receiving blanks into transfer relation, separate delivery paths for said masters and blanks converging toward a feeding location in advance of said reproducing rollers, feeder means individual to said delivery paths for said master and blanks, actuating means for each of said feeder means, sensing means individual to said delivery paths responsive to arrival of masters and blanks at said feed location, a drive for said reproducing rollers, coupling means selectively operable to connect said drive to said reproducing rollers, said coupling means being arranged for conjoint control by the individual sensing means whereby drive is imparted to said reproducing rollers only when a master and a blank are at said feeding locations, and means responsive to the respective sensing means and individually controlling the actuating means for feeder means of the associated feed path to render the same ineffective when a master or blank arrives at its feeding location.

4. A duplicating machine comprising reproducing rollers for bringing hectograph masters and impression-receiving blanks into transfer relation, separate feed paths for said masters and said blanks converging at said reproducing rollers, respective feeder means for delivering masters and blanks to said separate feed paths, individual actuating means for the respective feeder means, a coincidence detector in advance of said reproducing rollers including first and second sensing means individual to said feed paths responsive to pairing of masters and blanks at feeding locations adjacent said reproducing rollers, blocking means along the feed path for said masters obstructing feed of masters to said reproducing rollers, third sensing means at a check point in advance of said blocking means removing same from the feed path for said masters in response to sensing of a master at said check point, and means in controlling relation to the individual actuating means for the respective feeder means and controlled by the respective sensing means for selectively interrupting feed of masters and blanks.

5. A duplicating machine comprising reproducing rollers for bringing hectograph masters and impression-receiving blanks into transfer relation, separate feed paths for said masters and said blanks converging at said reproducing rollers, respective feeder means for delivering masters and blanks to said separate feed paths, actuating means for the respective feeder means, a coincidence detector in advance of said reproducing rollers including first and second sensing means individual to said feed paths responsive to pairing of masters and blanks at feeding locations adjacent said reproducing rollers, intermittently driven check rollers along the feed path for said masters obstructing feed of masters to said reproducing rollers, means responsive to said coincidence detector for imparting drive to said check rollers and reproducing rollers, and means individually controlling the actuating means for the respective feeder means and controlled by the respective sensing means for selectively interrupting feed of masters and blanks.

6. A duplicating machine comprising reproducing rollers for bringing hectograph masters and impression-receiving blanks into transfer relation, means including a conveyer providing a feed path for masters, means providing a feed path for blanks, respective feeders for delivering masters and blanks to said separate feed paths, actuating means for the respective feeder means, a coincidence detector in advance of said reproducing rollers including first and second sensing means individual to said feed paths responsive to pairing of masters and blanks at feeding locations adjacent said reproducing rollers, check and flick rollers following said conveyer for obstructing feed of masters to said reproducing rollers, means controlled by said coincidence detector for concurrently imparting drive to said check and flick rollers and said reproducing rollers, and means individually controlling the actuating means for the respective feeder means and controlled by said sensing means for selectively interrupting the feeder and conveyer for said masters and the feeder for said blanks.

7. A duplicating machine comprising cooperating reproducing rollers for engaging a master and blank at a pick-up location and bringing same into transfer relation, a drive for said reproducing rollers, coupling means selectively operable to connect said drive to said reproducing rollers, first feeder means for delivering masters along a first feed path to said pick-up location, second feeder means for delivering blanks along a second feed path to said pick-up location, a check station along said first feed path including a blocking member and auxiliary electrical sensing means in advance of said blocking members, means controlled by said electrical sensing means and operative to withdraw said blocking member and allow a single blank to pass toward said pick-up location, means controlled by said electrical sensing means and operative to interrupt delivery of masters by said first feeder means, main sensing means along said first and second feed paths and responsive to coincidence of a master and blank at said pick-up location, means controlled by said main sensing means for operating said coupling means whereby drive is imparted to said reproducing roller, and means controlled from the main sensing means along said second feed path and operative to interrupt delivery of blanks by said second feeder means.

8. A duplicating machine comprising cooperating reproducing rollers for engaging a master and blank at a pickup location and bring the same into transfer relation, a drive for said reproducing rollers, coupling means selectively operable to connect said drive to said reproducing rollers, first feeder means for delivering masters along a first feed path toward said pickup location, second feeder means for delivering blanks along a second feed path toward said pickup location, a pair of intermittently driven contacting check rollers along said first feed path in advance of said reproducing rollers, master-sensing means in advance of said check rollers, blank-sensing means along said second feed path, means controlled conjointly by said sensing means and operative to impart rotation to said check rollers whereby a single master is delivered toward said pickup location, and means controlled conjointly by said sensing means for operating said coupling means whereby drive is imparted to said reproducing rollers.

9. A duplicating machine comprising cooperating reproducing rollers for engaging a master and blank at a pickup location and bring the same into transfer relation, a drive for said reproducing rollers, coupling means selectively operable to connect said drive to said reproducing rollers, first feeder means for delivering masters along a first feed path toward said pickup location, second feeder means for delivering blanks along a second feed path toward said pickup location, a pair of contacting check rollers along said first feed path in advance of said reproducing rollers, first sensing means along said first feed path in advance of said check rollers responsive to arrival of successive masters at a first check point, further sensing means along said second feed path responsive to arrival of successive blanks at a further check point, means controlled by both of said sensing means and operative to impart rotation to said check rollers whereby a single master is delivered toward said pickup location, means controlled by said first sensing means and operative to interrupt delivery of masters by said first feeder means, means controlled by both of said sensing means for operating said coupling means whereby drive is imparted to said reproducing rollers, and means controlled by said further sensing means and operative to interrupt delivery of blanks by said second feeder means.

10. A duplicating machine comprising cooperating reproducing rollers for engaging a master and blank at a pickup location and bring the same into transfer relation, a drive for said reproducing rollers, coupling means selectively operable to connect said drive to said reproducing rollers, a first feeder, means including a conveyor extending from said first feeder toward said reproducing rollers for delivering masters along a first feed path toward said pickup location, a second feeder, means extending from said second feeder toward said reproducing rollers for delivering blanks along a second feed path toward said pickup location, a pair of contacting check rollers along said first feed path following said conveyor and in advance of said reproducing rollers, first electrical sensing means along said first feed path in advance of said check rollers responsive to arrival of masters at a first check point, second electrical sensing means along said second feed path responsive to arrival of blanks at a second check point, means controlled by both said first and second electrical sensing means and operative to impart rotation to said check rollers whereby a single master is delivered toward said pickup location, means controlled by said electrical sensing means and operatively connected to said first feeder and said conveyor to interrupt delivery of masters toward said check rollers, and means controlled by both said first and second electrical sensing means for operating said coupling means whereby drive is imparted to said reproducing rollers.

11. A duplicating machine comprising contacting reproducing rollers for engaging a master and blank at a pickup location and bring the same into transfer relation, means for periodically cycling said reproducing rollers, first feeder means for delivering masters along a first feed path toward said pickup location, a conveyer arranged along said first feed path and receiving successive masters from said first feeder means, second feeder means for delivering blanks along a second feed path toward said pickup location, a pair of check rollers along said first feed path following said conveyer and in advance of said reproducing rollers and serving to block delivery of masters to said reproducing rollers, first sensing means along said first feed path in advance of said check rollers responsive to arrival of masters at a first check point, second sensing means along said second feed path responsive to arrival of blanks at a second check point, means controlled by both of said sensing means and operative to rotate said check rollers to advance a master toward said pickup location, means controlled by said first sensing means and operative to interrupt delivery of masters by said first feeder means, means controlled by said second sensing means for operating said cycling means whereby drive is imparted to said reproducing rollers, and means controlled from said second sensing means along said second feed path and operative to interrupt delivery of blanks by said second feeder means.

12. A duplicating machine comprising contacting reproducing rollers for engaging a master and blank at a pickup location and bring the same into transfer relation, means for periodically cycling said reproducing rollers, first feeder means for delivering masters along a first feed path toward said pickup location, a conveyer arranged along said first feed path and receiving successive masters from said first feeder means, second feeder means for delivering blanks along a second feed path toward said pickup location, a pair of check rollers along said first feed path following said conveyer and in advance of said reproducing rollers and serving to block delivery of masters to said reproducing rollers, first photoelectric sensing means along said first feed path in advance of said check rollers operated by the advance of successive masters along said first feed path, second photoelectric sensing means along said second feed path operated by the advance of successive blanks along said second feed path, and means controlled by both of said sensing means and operative to rotate said check rollers to advance a master toward said pickup location and to operate said coupling means whereby drive is imparted to said reproducing rollers.

13. A duplicating machine according to claim 12 wherein said conveyer includes a pair of end rollers, an endless belt trained about said end rollers, and a flick roller in contact with and driven from the end roller adjacent said first feeder means.

14. A duplicating machine according to claim 12 wherein the pressure urging said reproducing rollers together is greater than the pressure urging said check rollers together whereby a master in contact with both sets of rollers is effectively taken over by said reproducing rollers.

15. A duplicating machine comprising contacting reproducing rollers for engaging a master and blank at a pickup location and bring the same into transfer relation, means for periodically cycling said reproducing rollers, first feeder means for delivering masters along a first feed path toward said pickup location, a conveyer arranged along said first feed path and receiving successive masters from said first feeder means, second feeder means for delivering blanks along a second feed path toward said pickup location, a pair of check rollers along said first feed path following said conveyer and in advance of said reproducing rollers and serving to block delivery of masters to said reproducing rollers, first sensing means along said first feed path in advance of said check rollers operated by the advance of successive masters along said first feed path, second sensing means along said feed path in advance of said reproducing rollers operated by the advance of successive blanks along said second feed path, means controlled by at least said first and second sensing means and operative to rotate said check rollers to advance a master toward said pickup location, third sensing means following said reproducing rollers and operated by the advance of successive paired masters and blanks through and past said reproducing rollers, and means controlled by said first, second and third sensing means for operating said coupling means whereby drive is imparted to said reproducing rollers.

16. In a duplicating machine a pair of contacting duplicating rollers, first feeding mechanism for delivering stock along a first feed path toward said duplicating rollers, second feeding mechanism for delivering stock along a second feed path toward said duplicating rollers, check rollers in advance of said duplicating rollers along said first path, first photoelectric means arranged to direct a first light beam across said first feed path adjacent to and in advance of said check rollers and responsive to passage of successive pieces of stock, a second photoelectric means arranged to direct a second light beam across said second feed path at a location in advance of said duplicating rollers and responsive to passage of successive pieces of stock, means operatively connected to said first feeding mechanism and controlled from said first photoelectric means for disrupting feed in response to interruption of said first light beam, means operatively connected to said second feeding mechanism and controlled from said second photoelectric means for disrupting feed in response to interruption of said second light beam, and means operatively connected to said duplicating rollers and controlled by both said photoelectric means for imparting drive to said duplicating rollers in response to interruption of both of said light beams.

17. In a duplicating machine, a pair of contacting duplicating rollers, a master-feeding mechanism for delivering masters along a first feed path toward said duplicating rollers, a blank-feeding mechanism for delivering blanks along a second feed path toward said duplicating rollers, first photoelectric means arranged to direct a first light beam across said first feed path adjacent to and in advance of said duplicating rollers and responsive to passage of successive masters, a second photoelectric means arranged to direct a second light beam across said second feed path at a location in advance of said duplicating rollers and responsive to passage of successive blanks, means operatively connected to said master-feeding mechanism and controlled from said first photoelectric means for disrupting feed of master in response to interruption of said first light beam, means operatively connected to said blank-feeding mechanism and controlled from said second photoelectric means for disrupting feed of blanks in response to interruption of said second light beam, and means operatively connected to said duplicating rollers and controlled by both said photoelectric means for imparting drive to said duplicating rollers in response to interruption of both of said light beams.

18. A duplicating machine comprising cooperating reproducing rollers for engaging a master and blank at a pickup location and bringing the same into transfer relation, a drive for said reproducing rollers, coupling means operable to connect said drive to said reproducing rollers, first feeder means for delivering masters along a first feed path toward said pickup location, second feeder means for delivering blanks along a second feed path toward said pickup location, a pair of contacting check rollers along one of said feed paths in advance of said reproducing rollers, sensing means along said one feed path in advance of said check rollers and responsive to movement of masters past a first check point, further sensing means along the other one of said feed paths and responsive to movement of blanks past a further check point, and means controlled conjointly by said sensing means and operative to impart rotation to said check rollers and to said reproducing rollers.

19. A duplicating machine comprising cooperating reproducing rollers for engaging a master and blank at a pickup location and bringing the same into transfer relation, a drive for said reproducing rollers, coupling means operable to connect said drive to said reproducing rollers, first feeder means for delivering masters along a first feed path toward said pickup location, second feeder means for delivering blanks along a second feed path toward said pickup location, a pair of contacting check rollers along one of said feed paths in advance of said reproducing rollers, sensing means along said one feed path in advance of said check rollers and operable upon arrival of successive masters at a check point, further sensing means along the other one of said feed paths and operable upon arrival of successive blanks at a check point, means controlled conjointly by said sensing means and operative to impart rotation to said check rollers and to said reproducing rollers, means controlled by said first sensing means and operative to interrupt delivery of masters by said first feeder means, and means controlled by said further sensing means and operative to interrupt delivery of blanks by said second feeder means.

References Cited in the file of this patent

UNITED STATES PATENTS

| Number | Name | Date |
| --- | --- | --- |
| 1,253,824 | Holmes | Jan. 15, 1918 |
| 1,564,221 | Duncan | Dec. 8, 1925 |
| 2,344,345 | Elliott | Mar. 14, 1944 |
| 2,572,450 | Crissy | Oct. 23, 1951 |
| 2,617,647 | Davis | Nov. 11, 1952 |
| 2,765,733 | Golwitzer | Oct. 9, 1956 |
| 2,766,685 | Sauerman | Oct. 16, 1956 |
| 2,771,838 | Federwitz | Nov. 27, 1956 |

FOREIGN PATENTS

| Number | Country | Date |
| --- | --- | --- |
| 562,507 | Germany | Oct. 26, 1932 |